United States Patent [19]

Miyake et al.

[11] 4,368,175

[45] Jan. 11, 1983

[54] ION EXCHANGE ENRICHMENT OF URANIUM ISOTOPES

[75] Inventors: Tetsuya Miyake, Kawasaki; Kunihiko Takeda, Yokohama; Hatsuki Onitsuka, Fujisawa, all of Japan

[73] Assignee: Asahi Kasei Kogyo Kabushiki Kaisha, Osaka, Japan

[21] Appl. No.: 156,727

[22] Filed: Jun. 5, 1980

[30] Foreign Application Priority Data

Jun. 22, 1979 [JP] Japan .................................. 54-78069

[51] Int. Cl.$^3$ ............................................. C01G 43/00
[52] U.S. Cl. ............................................. 423/7; 423/6
[58] Field of Search ........................................ 423/6, 7

[56] References Cited

U.S. PATENT DOCUMENTS

| | | | |
|---|---|---|---|
| 3,953,568 | 4/1976 | Seko et al. | 423/7 |
| 3,953,569 | 4/1976 | Seko et al. | 423/7 |
| 4,049,769 | 9/1977 | Seko et al. | 423/7 |
| 4,112,044 | 9/1978 | Miyake et al. | 423/7 |
| 4,112,045 | 9/1978 | Seko et al. | 423/7 |
| 4,202,860 | 5/1980 | Miyake et al. | 423/7 |

*Primary Examiner*—Edward A. Miller
*Attorney, Agent, or Firm*—Sprung, Horn, Kramer & Woods

[57] ABSTRACT

A process for the enrichment of one isotope in a mixture of uranium isotopes by passing a solution of the mixture in a solvent through an anion exchanger thereby forming on the anion exchanger a boundary (A) between a uranium adsorption zone and an adjacent reducing agent zone and/or a boundary (B) between a uranium adsorption zone and an adjacent oxidizing agent zone, the uranium adsorption zone advancing through the anion exchanger, effecting reduction at the boundary (A) and/or effecting oxidation at the boundary (B), thereby effecting enrichment adjacent said boundary, and separating a fraction enriched in one of said isotopes, which process comprises using as the solvent medium a composition comprising (a) a solvent having a dielectric constant of at least 80 at 20° C., (b) hydrochloric acid and (c) at least one of hydrobromic acid and sulfuric acid, the solvent medium having a hydrogen ion concentration of about 0.1 M/l to about 10 M/l, a total chlorine ion concentration of about 0.1 M/l to about 12 M/l, at least one of bromine and sulfate ion being present in about 0.01 M/l to about 10 M/l and the other being present in from zero up to 10 M/l, and passing the materials through the ion exchanger at a rate such that the migration velocity of the uranium adsorption zone through the ion exchanger is at least about 1 cm per minute.

6 Claims, No Drawings

ION EXCHANGE ENRICHMENT OF URANIUM ISOTOPES

BACKGROUND OF THE INVENTION

1. Field of the Invention

This invention relates to a process for chemically separating uranium isotopes by oxidation-reduction chromatography using an anion exchanger.

2. Description of the Prior Art

It is known that uranium isotopes can be separated by developing a uranium adsorption zone on an anion exchanger as the adsorbent in its displacing state while oxidizing the uranium adsorption zone at its frontal region and reducing the uranium adsorption zone at its rear region (see British Pat. No. 1,443,962, U.S. Pat. Nos. 4,049,769, 4,092,398, 4,112,044 and 4,118,457). According to these methods a relatively high efficiency of separating uranium isotopes can be obtained.

An object of this invention is to further improve the efficiency of separating uranium isotopes.

SUMMARY OF THE INVENTION

This object is realized in accordance with the present invention pursuant to which there is provided an improvement in the separation of uranium isotopes by passing a solution in a solvent medium of uranium isotopes through an anion exchanger thereby forming on the anion exchanger a boundary (A) between a uranium adsorption zone and an adjacent reducing agent zone and/or a boundary (B) between a uranium adsorption zone and an adjacent oxidizing agent zone, the uranium adsorption zone advancing through the anion exchanger and conducting reduction at the boundary (A) and/or conducting oxidation at the boundary (B). In accordance with the improvement, there is employed as the solvent medium a composition comprising (a) a solvent having a dielectric constant of at least 80 at 20° C., (b) hydrochloric acid and (c) at least one of hydrobromic acid and sulfuric acid, the solvent medium having a hydrogen ion concentration of about 0.1 M/l to about 10 M/l, a total chlorine ion concentration of about 0.1 M/l to about 12 M/l, at least one of bromine and sulfate ion being present in about 0.01 M/l to about 10 M/l and the other being present in from zero up to 10 M/l, the materials being passed through the ion exchanger at a rate such that the migration velocity of the uranium adsorption zone through the ion exchanger is at least about 1 cm per minute.

According to this invention, the use of the above described solvent together with hydrochloric acid and at least one of hydrobromic acid and sulfuric acid serves to stabilize the uranium concentration in a uranium adsorption zone which in turn improves enrichment and simultaneously improves the selectivities of U(VI) ion and U(VI) ion on an anion exchanger relative to solutions thereof in contact with such exchanger. Also when the uranium adsorption zone is advanced at the migration velocity of about 1 cm per minute or more, there will be minimal disturbance of the uranium adsorption zone with sharp boundaries which results in a high efficiency of separation of uranium isotopes.

DETAILED DESCRIPTION OF THE INVENTION

The solvent herein used means the solvent medium exclusive of hydrochloric acid, hydrobromic acid, sulfuric acid and their metal salts, the oxidizing agent, the reducing agent and uranium ions.

The hydrochloric, hydrobromic and sulfuric acids include those acids added as such as well as those formed in the solvent medium. For example, in a solvent medium obtained by mixing HCl with NaBr, HBr is formed and this can constitute one of (c) hereinabove while the added HCl can constitute (b) hereinabove.

In order to maintain stable metal ions in the solvent medium for the separation of uranium isotopes and to maintain the uranium concentration in a uranium adsorption zone constant, the hydrogen ion concentration ranges from about 0.1 M/l to about 10 M/l, the total chlorine ion concentration ranges from about 0.1 M/l to about 0.01 M/l, and at least one of bromine and sulfate ion being present in about 0.1 M/l to about 10 M/l and the other being present in from zero up to about 10 M/l. From the viewpoint of the selectivity to an anion exchange resin it is preferred that a total chlorine ion concentration is about 1.6 M/l to about 7 M/l and that a total bromine ion concentration is about 0.3 M/l to about 6 M/l and/or a total sulfate ion concentration is 0.1 M/l to about 2.2 M/l. The total chlorine ion herein used means a total amount of chlorine ion in the solvent medium and chlorine ion coordinating with hydrogen or metal ions. With regard to the total bromine ion and/or sulfate ion, the same definition as with the total chlorine ion is employed.

The hydrogen ion concentration in the solution may be controlled be employing any of hydrochloric acid, hydrobromic acid and sulfuric acid or, if necessary or if desired, any mixture thereof. Also in order to control the concentration of chlorine ion, bromine ion and sulfate ion independent of the hydrogen ion, it is possible to employ salts of the above described inorganic acids, i.e. salts of a metal ion which has a weak adsorbability on an anion exchanger, such as chlorides, bromides and sulfates of sodium, potassium, calcium, ammonium, lithium, beryllium, nickel (II), chromium (III) or cobalt (II), or salts of a metal ion which can be employed as the reducing agent and the oxidizing agent in this invention.

"Dielectric constant" as employed herein is described in John A. Riddick and William B. Bunger, "Organic Solvents", 3rd ed., Wiley-Interscience, New York, January 1970.

Exemplary solvents having a dielectric constant of at least 80 which can be employed include water, formamide, N-methylacetamine, N-methylformamide, N-methylpropioamide, N-methylbutylamide, ethylene carbonate and their mixtures.

The migration velocity of the uranium adsorption zone is mainly determined by factors such as the ratio of the flow amount of a developing solution to the cross sectional area of a developing column, the adsorbability of uranium in the uranium adsorption zone on the anion exchange resin, the concentration of the reducing agent used for development, the adsorbability of the oxidizing agent on the anion exchange resin and others.

The migration velocity of the uranium adsorption zone which can be employed in this invention is typically at least about 1 cm per minute and its upper limit is determined by the pressure drop in the developing column employed. For practical purposes, a preferred migration velocity of the uranium adsorption zone ranges from about 1 cm per minute to about 500 cm per minute and a more preferred migration velocity ranges from about 3 cm per minute to about 100 cm per minute.

The preferred reducing agents which can be used in combination with the above described solution include compounds of Cr(II), Cu(I), V(II), V(III), Mo(III), Sn(II) and Ti(III).

The preferred oxidizing agents which can be used in combination with the above described solution include compounds of V(V), Fe(III), Ce(IV), Tl(III), Mo(VI) and Mn(VII).

With the above described solution conditions and the above described reducing agents and oxidizing agents, the concentration of the solvent medium can be kept constant independent of the migration velocity of a uranium adsorption zone.

There are three types of embodiments for the separation systems of uranium isotopes which may be employed in this invention, i.e. a reduction breakthrough method, an oxidation breakthrough method and a band method.

The reduction breakthrough method comprises passing an acidic solution through a developing column packed with an exchanger to condition the exchanger, feeding a uranyl or mixed uranyl and uranous solution to the column to adsorb the uranium on the exchanger, introducing a reducing agent solution to the column to reduce the uranium and to advance the uranium adsorption zone, thereby obtaining a region near the reduction boundary of the uranium adsorption zone which is enriched in uranium 235.

The oxidation breakthrough method comprises passing an acidic solution through a developing column packed with an exchanger to condition the exchanger, feeding an oxidizing agent solution to the column to adsorb the oxidizing agent on the exchanger, introducing a uranous or mixed uranous and uranyl solution to the column to effect oxidation with formation of an oxidation boundary and migration of the uranium adsorption zone, thereby obtaining a region near the oxidation boundary of the uranium adsorption zone which is depleted in uranium 235.

The band method comprises passing a hydrochloric acid solution through a developing column packed with an exchanger to condition the exchanger, feeding an oxidizing agent solution to the column to adsorb the oxidizing agent on the exchanger, feeding a uranous or mixed uranous or uranyl solution to the column to effect oxidation with formation of a uranium adsorption zone, and further feeding a reducing agent solution to the column, thereby developing the uranium adsorption zone by displacement while effecting oxidation at the downstream end of the uranium adsorption zone and effecting reduction at the upsteam end of the uranium adsorption zone. According to the band method there can be obtained a region having a higher uranium 238 concentration near the oxidation boundary of the uranium adsorption zone and a region having a higher uranium 235 concentration near the reduction boundary of the uranium adsorption zone.

In these three methods, the kinds of the acids or the concentrations of chlorine ion, bromine ion and sulfate ion which can be employed for the uranium solution and the oxidizing agent solution may be different from those which can be employed for the reducing agent solution. In order to reduce disturbance at the boundaries of the uranium adsorption zone, it is preferred that these kinds of acids and their concentrations be the same.

Exemplary anion exchangers which can be employed in this invention include chloromethylated and aminated products of a crosslinked high molecular weight polymer prepared by addition copolymerization of styrene, vinyltoluene and ethylvinylbenzene with divinylbenzene as the main components; aminated products of a cross-linked polymer prepared by addition copolymerization of, as the main components, a monomer having an active group such as chloromethylstyrene, methylethyl ketone, epoxybutadiene or acrylamide with a cross-linking monomer such as divinylbenzene or triallyl cyanurate; cross-linked polymers prepared by polymerization of a monomer having a nitrogen capable of becoming an exchange group such as N-vinylsuccinimide, N-vinylphthalimide, vinylcarbazole, vinylimidazole, vinylpyridine, vinyltetrazole, vinylquinoline or divinylpyridine as the main component or by copolymerization of such a monomer having a nitrogen capable of becoming an exchange group with a cross-linking monomer, if desired, or reaction products with such a monomer having a nitrogen capable of becoming an exchange group; a cross-linked polycondensate prepared by condensation of an amine such as polyethyleneimine or hexamethylenediamine with a polyfunctional compound; and those in which an ion exchangeable liquid such as tributyl phosphate or trioctylamine is supported on the solid surface of silica gel or a zeolite.

The temperature which may be employed in the separation of uranium isotopes according to this invention can be varied widely, depending upon the selectivity of uranium for the anion exchanger which is determined by the oxidizing agent, the reducing agent, the concentrations of the inorganic acids employed, and the oxidation-reduction velocity of uranium, and typically ranges from about 10° C. to about 250° C. and preferably from about 80° C. to about 170° C.

The process of this invention will now be illustrated in greater detail by reference to the following examples but these examples are not to be interpreted as limiting the invention in any way. In the following examples and comparative examples, a concentrated uranous solution was prepared by dissolving uranium metal into 12 N hydrochloric acid (guaranteed reagent) to form a uranous chloride solution, and a concentrated uranyl solution was prepared by adding an aqueous hydrogen peroxide solution to a necessary amount of the concentrated uranous solution to oxidize uranium (IV) to uranium (VI) and removing excess hydrogen peroxide by heating. As the oxidizing agents and the reducing agents, commercially available compounds were employed and compounds of V(II), Cr(II) and Mo(III) were prepared by subjecting hydrochloric acid solutions of compounds of V(III), Cr(III) and Mo(VI) to electrolytic reduction. Using thus prepared solutions, there were obtained conditioning solutions, oxidizing agent solutions, reducing agent solutions and uranium solutions. The uranium 235/uranium 238 isotopic ratio (hereinafter "U235/U238 isotopic ratio") in the starting uranium employed in these examples and comparative examples was 0.007252.

EXAMPLE 1

An anion exchange resin prepared by chloromethylating a styrene-divinylbenzene copolymer and then quaternizing the copolymer with trimethylamine and having an exchange capacity of 4.3 meq/g-dry resin, the divinylbenzene being employed in an amount of 10% by weight in the synthesis of the styrenedivinylbenzene copolymer, was filled uniformly up to 900 mm in a jacketed developing column having an inside diameter of 20 mm and a length of 1,000 mm. Ten liters of an aqueous conditioning solution containing an acid and inorganic acid salts in an amount as set forth in Table 1 was fed to the top of the column by a pump to condition the packed layer of the anion exchange resin. Then an aqueous oxidizing agent solution having the same composition as the aqueous conditioning solution and additionally containing an oxidizing agent in an amount as set forth in Table 1 was fed to the top of the column to adsorb the oxidizing agent on the anion exchange resin until the composition of the solution from the bottom of the column became equal to the composition of the fed aqueous oxidizing agent solution. Then an aqueous uranium solution having the same composition as the aqueous conditioning solution and additionally containing uranium (IV) ion in an amount as set forth in Table 1 was fed to the top of the column to form a uranium adsorption zone and subsequently an aqueous reducing agent solution having the same composition as the aqueous conditioning solution and additionally containing a reducing agent in an amount as set forth in Table 1 at a flow rate as set forth in Table 1 to develop the uranium adsorption zone by displacement at a migration velocity and a migration distance as set forth in Table 1. The eluant from the bottom of the column was collected as separate fractions of 2.0 ml, and the concentrations of uranium in the regions near the oxidation boundary and near the reduction boundary of the uranium adsorption zone were determined spectrophotometrically and also the uranium solutions in the regions near the oxidation boundary and near the reduction boundary were collected and purified and the U235/U238 isotopic ratio was measured using a mass spectrometer. The results are shown in Table 1.

EXAMPLES 2 TO 21

The same procedures as in Example 1 were repeated using an aqueous conditioning solution, an aqueous oxidizing agent solution having the same composition as the aqueous conditioning solution and additionally containing an oxidizing agent, an aqueous uranium solution having the same composition as the aqueous conditioning solution and additionally containing uranium (IV) ion and an aqueous reducing agent solution having the same composition as the aqueous conditioning solution and additionally containing a reducing agent at a flow rate of the reducing agent solution and a migration velocity of the uranium adsorption zone as set forth in Table 1.

When the migration distance of the uranium adsorption zone was up to 5.5 m, the apparatus for enrichment of uranium isotopes was constructed by appropriately connecting any of five developing columns having an inner diameter of 20 mm and a length of 1,000 mm as in Example 1, one developing column having an inner diameter of 20 mm and a length of 500 mm and one developing column having an inner diameter of 20 mm and a length of 300 mm, each being equipped with a jacket, through three-way switch-over valves in series and filling the same anion exchange resin as in Example 1 into these columns.

When the migration distance of the uranium adsorption zone was longer than 5.5 m, the apparatus was constructed by connecting three jacketed developing columns having an inner diameter of 20 mm and a length of 1,000 mm as in Example 1 through three-way switch-over valves in series. First, the three columns filled with the same anion exchange resin as in Example 1 were conditioned with the aqueous conditioning solution. Second, to the first to three columns was fed the aqueous oxidizing agent solution to adsorb the oxidizing agent on the anion exchange resin. Third, to the first column was fed the aqueous uranium solution to form a uranium adsorption zone. Fourth, the aqueous reducing agent solution was fed to the first column to effect migration of the uranium adsorption band, and upon completion of the migration of the uranium adsorption zone from the first column to the second column, the liquid flow from the first column to the second column was cut off by the connecting three-way switch-over valve. Fifth, the aqueous reducing agent solution was fed to the second column to effect migration of the uranium adsorption while the aqueous oxidizing agent solution was fed to the first column to adsorb the oxidizing agent on the anion exchange resin. Then these procedures were repeatedly conducted until a desired migration distance of the uranium adsorption zone was attained. When the migration distance had a fraction less than 1 m, the developing column having a length of 500 mm or 300 mm was connected with the above described three developing columns having a length of 1,000 mm.

TABLE 1

| Example Nos. | Aqueous Conditioning Solution (M/l) | | Oxidizing Agent (M/l) | Uranium Ion (M/l) | Reducing Agent (M/l) | Flow Rate of Reducing Agent Solution (ml/minute) | Uranium Adsorption Zone | | U235/U238 Isotopic Ratio (molar ratio) | |
|---|---|---|---|---|---|---|---|---|---|---|
| | | | | | | | Migration Velocity (cm/minute) | Migration Distance (m) | Oxidation Boundary | Reduction Boundary |
| 1 | HCl | 4.0 | Mn(VII)ion 0.03 | U(IV)ion 0.15 | Cr(II)ion 0.3 | 10 | 1.5 | 0.9 | 0.006941 | 0.007577 |
| | LiCl | 0.8 | | | | | | | | |
| | NiBr$_2$ | 1.0 | | | | | | | | |
| | LiBr | 1.2 | | | | | | | | |
| 2 | HCl | 4.7 | Fe(III)ion 0.10 | U(IV)ion 0.5 | Mo(III)ion 0.5 | 107 | 15.3 | 9.18 | 0.006858 | 0.007666 |
| | HBr | 1.7 | | | | | | | | |
| | FeCl$_2$ | 1.3 | | | | | | | | |
| | LiBr | 2.0 | | | | | | | | |
| 3 | HCl | 4.0 | Mo(VI)ion 0.04 | U(IV)ion 0.2 | V(III)ion 0.4 | 64.4 | 10.4 | 6.24 | 0.006822 | 0.007710 |
| | HBr | 1.9 | | | | | | | | |
| | LiCl | 1.1 | | | | | | | | |
| | FeBr$_2$ | 1.1 | | | | | | | | |
| 4 | HCl | 2.1 | V(V)ion 0.005 | U(IV)ion 0.05 | Cu(I)ion 0.1 | 41.9 | 5.7 | 3.42 | 0.006897 | 0.007622 |
| | HBr | 0.4 | | | | | | | | |
| | LiBr | 0.1 | | | | | | | | |
| 5 | HCl | 2.5 | Tl(III)ion 0.03 | U(IV)ion 0.2 | Sn(II)ion 0.2 | 210 | 25.8 | 15.50 | 0.006807 | 0.007726 |
| | HBr | 5.0 | | | | | | | | |
| | CoBr$_2$ | 0.5 | | | | | | | | |
| 6 | HCl | 0.8 | Ce(IV)ion | U(IV)ion | Cr(II)ion | 314 | 41.5 | 24.90 | 0.006780 | 0.007755 |

TABLE 1-continued

| Example Nos. | Aqueous Conditioning Solution (M/l) | | Oxidizing Agent (M/l) | Uranium Ion (M/l) | Reducing Agent (M/l) | Flow Rate of Reducing Agent Solution (ml/minute) | Uranium Adsorption Zone | | U235/U238 Isotopic Ratio (molar ratio) | |
|---|---|---|---|---|---|---|---|---|---|---|
| | | | | | | | Migration Velocity (cm/minute) | Migration Distance (m) | Oxidation Boundary | Reduction Boundary |
| | $FeCl_2$ | 1.1 | 0.05 | 0.15 | 0.3 | | | | | |
| | LiBr | 2.1 | | | | | | | | |
| 7 | HCl | 1.2 | Fe(III)ion 0.07 | U(IV)ion 0.3 | V(II)ion 0.4 | 243 | 34.1 | 20.50 | 0.006835 | 0.007696 |
| | LiCl | 2.9 | | | | | | | | |
| | $NiBr_2$ | 0.8 | | | | | | | | |
| | LiBr | 1.8 | | | | | | | | |
| 8 | HCl | 1.4 | Mn(VII)ion 0.1 | U(IV)ion 0.2 | V(II)ion 0.4 | 104 | 13.4 | 8.04 | 0.006893 | 0.007626 |
| | $H_2SO_4$ | 0.8 | | | | | | | | |
| | $NiSO_4$ | 0.8 | | | | | | | | |
| 9 | HCl | 4.1 | V(V)ion 0.03 | U(IV)ion 0.04 | Mo(III)ion 0.3 | 148 | 22.3 | 13.04 | 0.006873 | 0.007651 |
| | $H_2SO_4$ | 1.3 | | | | | | | | |
| | LiCl | 2.3 | | | | | | | | |
| | $(NH_4)SO_4$ | 1.0 | | | | | | | | |
| 10 | HCl | 2.0 | Fe(III)ion 0.10 | U(IV)ion 0.3 | V(III)ion 0.7 | 63 | 10.7 | 6.42 | 0.006842 | 0.007689 |
| | $H_2SO_4$ | 0.2 | | | | | | | | |
| | LiCl | 2.3 | | | | | | | | |
| | $FeSO_4$ | 1.0 | | | | | | | | |
| 11 | HCl | 1.5 | Tl(III)ion 0.02 | U(IV)ion 0.3 | Cu(I)ion 0.7 | 31.9 | 8.1 | 4.86 | 0.006925 | 0.007592 |
| | $H_2SO_4$ | 2.0 | | | | | | | | |
| | $CoSO_4$ | 0.6 | | | | | | | | |
| | $Li_2SO_4$ | 0.3 | | | | | | | | |
| 12 | HCl | 0.8 | Ce(IV)ion 0.04 | U(IV)ion 0.3 | Cr(II)ion 0.5 | 252 | 45.5 | 27.30 | 0.006784 | 0.007748 |
| | $H_2SO_4$ | 0.8 | | | | | | | | |
| | LiCl | 2.2 | | | | | | | | |
| | $FeSO_4$ | 0.3 | | | | | | | | |
| 13 | HCl | 2.3 | Mo(VI)ion 0.02 | U(IV)ion 0.1 | Ti(III)ion 0.2 | 228 | 31.0 | 18.60 | 0.006829 | 0.007700 |
| | $H_2SO_4$ | 0.8 | | | | | | | | |
| | $NiCl_2$ | 1.2 | | | | | | | | |
| 14 | HCl | 3.6 | Mo(VI)ion 0.01 | U(IV)ion 0.1 | Sn(II)ion 0.15 | 41.5 | 5.8 | 3.48 | 0.006888 | 0.007637 |
| | $H_2SO_4$ | 1.8 | | | | | | | | |
| | $Li_2SO_4$ | 0.3 | | | | | | | | |
| 15 | HCl | 1.0 | Mn(VII)ion 0.15 | U(IV)ion 0.3 | V(III)ion 0.7 | 203 | 31.0 | 18.70 | 0.006760 | 0.007776 |
| | HBr | 0.5 | | | | | | | | |
| | LiCl | 1.8 | | | | | | | | |
| | $FeSO_4$ | 0.7 | | | | | | | | |
| 16 | HCl | 1.0 | Fe(III)ion 0.05 | U(IV)ion 0.2 | Cr(II)ion 0.5 | 24 | 4.1 | 2.46 | 0.006932 | 0.007585 |
| | HBr | 2.0 | | | | | | | | |
| | $H_2SO_4$ | 1.3 | | | | | | | | |
| | $NiBr_2$ | 1.0 | | | | | | | | |
| | $Li_2SO_4$ | 1.0 | | | | | | | | |
| 17 | HCl | 4.3 | Mo(VI)ion 0.01 | U(IV)ion 0.2 | Mo(III)ion 0.3 | 53.4 | 12.2 | 7.32 | 0.006893 | 0.007629 |
| | HBr | 2.0 | | | | | | | | |
| | $CoSO_4$ | 0.9 | | | | | | | | |
| | $Li_2SO_4$ | 0.9 | | | | | | | | |
| 18 | HCl | 0.5 | Ce(IV)ion 0.04 | U(IV)ion 0.2 | Cu(I)ion 0.4 | 106 | 17.1 | 10.20 | 0.006924 | 0.007599 |
| | HBr | 0.4 | | | | | | | | |
| | $H_2SO_4$ | 1.5 | | | | | | | | |
| | $FeCl_2$ | 0.4 | | | | | | | | |
| | $Li_2SO_4$ | 0.8 | | | | | | | | |
| 19 | HCl | 0.9 | Tl(III)ion 0.01 | U(IV)ion 0.3 | V(II)ion 0.3 | 98.6 | 25.2 | 15.10 | 0.006784 | 0.007748 |
| | $NiCl_2$ | 0.8 | | | | | | | | |
| | LiBr | 0.1 | | | | | | | | |
| | $FeSO_4$ | 1.3 | | | | | | | | |
| 20 | HCl | 1.5 | Fe(III)ion 0.01 | U(IV)ion 0.05 | Ti(III)ion 0.1 | 460 | 52.5 | 31.50 | 0.006741 | 0.007800 |
| | HBr | 1.5 | | | | | | | | |
| | $H_2SO_4$ | 0.3 | | | | | | | | |
| | LiCl | 1.5 | | | | | | | | |
| | $NiSO_4$ | 1.5 | | | | | | | | |
| 21 | HCl | 3.6 | V(V)ion 0.08 | U(IV)ion 0.1 | Sn(II)ion 0.2 | 91.6 | 8.8 | 5.28 | 0.006950 | 0.007563 |
| | HBr | 1.0 | | | | | | | | |
| | $H_2SO_4$ | 2.0 | | | | | | | | |
| | $CoBr_2$ | 0.5 | | | | | | | | |
| | $Li_2SO_4$ | 0.3 | | | | | | | | |

Note:
80ml of the uranium solution: Examples 1, 3–12, 14–16, 18 and 20
70ml of the uranium solution: Examples 2, 13, 17, 19 and 21
60ml of the uranium solution: Example 5

EXAMPLES 22 TO 23 & COMPARATIVE EXAMPLES 1 TO 2

The apparatus for enrichment of uranium isotopes was constructed by connecting three jacketed developing columns having an inner diameter of 20 mm and a length of 1,000 mm as in Examples 2 to 21 with three-way switch-over valves in series and filling the same anion exchange resin as in Example 1 in these columns. To the first to third columns were fed 10 l of an aqueous conditioning solution containing an acid and inorganic acid salts in an amount as set forth in Table 2 by a pump to condition the packed layer of the anion exchange resin and then to the first to third columns was fed an aqueous uranium solution having the same composition as the aqueous conditioning solution and additionally containing 0.03 M/l of uranium (VI) ion to adsorb uranium (VI) ion on the anion exchange resin in the first to third columns until the composition of the solution from the bottom of the third column became equal to the composition of the fed aqueous uranium solution. Then an aqueous reducing agent solution having the same composition as the aqueous conditioning solution and additionally containing 0.3 M/l of Cr(II) ion was fed to the first to third columns at a flow rate as set forth in Table 2 to develop the uranium adsorption zone by displacement. The eluant from the bottom of the third column was collected as separate fractions of 2.0 ml and the concentration of uranium in the region near the reduction boundary of the uranium adsorption zone was determined spectrophotometrically and also the uranium solution in the region near the reduction boundary was collected and purified and the U235/U238 isotopic ratio was measured using a mass spectrometer. The results are shown in Table 2.

COMPARATIVE EXAMPLE 3

The procedure of Example 22 was repeated for the same period of development as in Example 22 except that one jacketed developing column having an inside diameter of 20 mm and a length of 500 mm and filled with the same anion exchange resin as in Example 1 was employed and that the flow rate of the aqueous reducing agent solution was 3.3 ml/minute. The U235/U238 isotopic ratio in the region near the reduction boundary was 0.007502.

the anion exchange resin in the columns. Then an aqueous oxidizing agent solution having the same composition as the aqueous conditioning solution and additionally containing 0.03 M/l of Fe(III) ion was fed to the first to fifth columns to adsorb the oxidizing agent on the anion exchange resin in the columns until the composition of the solution from the bottom of the fifth column became equal to that of the fed aqueous oxidizing agent solution. Then an aqueous uranium solution having the same composition as the aqueous conditioning solution and additionally containing 0.15 M/l of U(IV) ion and 0.02 M/l of U(VI) ion was fed to the first column to develop the uranium adsorption zone by displacement while forming an oxidation boundary from the first to fifth columns at a migration velocity of 7.9 cm/minute and a migration distance of 4.74 m. The eluant from the bottom of the fifth column was collected as separate fractions of 2.0 ml and the concentration of uranium in the region near the oxidation boundary was determined spectrophotometrically and also the uranium solution in the region near the oxidation boundary was collected and purified and the U235/U238 isotopic ratio was measured using a mass spectrometer and was 0.006898.

EXAMPLE 25

The apparatus for enrichment of uranium isotopes was constructed by connecting four jacketed developing columns having an inner diameter of 20 mm and a length of 1,000 mm as in Example 1 with three-way switch-over valves in series and filling the same anion exchange resin as in Example 1 in these columns. To the first to four columns were fed 10 l of an aqueous condi-

TABLE 2

| | Aqueous Conditioning Solution (M/l) | | Flow Rate of Reducing Agent Solution (ml/minute) | Uranium Adsorption Zone | | U235/U238 Isotopic Ratio (molar ratio) Reduction Boundary |
|---|---|---|---|---|---|---|
| | | | | Migration Velocity (cm/minute) | Migration Distance (m) | |
| Example Nos. | | | | | | |
| 22 | HCl | 2.0 | 27.6 | 4.2 | 2.52 | 0.007636 |
| | LiCl | 2.8 | | | | |
| | HBr | 1.5 | | | | |
| 23 | HCl | 2.0 | 27.3 | 4.2 | 2.52 | 0.007641 |
| | LiCl | 2.8 | | | | |
| | HBr | 1.5 | | | | |
| | HCONH$_2$ | 2.0 | | | | |
| Comparative Run Nos. | | | | | | |
| 1 | HCl | 3.5 | 28.3 | 4.2 | 2.52 | 0.007533 |
| | LiCl | 2.8 | | | | |
| 2 | HCl | 3.5 | 29.1 | 4.2 | 2.52 | 0.007563 |
| | LiCl | 2.8 | | | | |
| | CH$_3$OH | 5.0 | | | | |
| 3 | HCl | 2.0 | 3.3 | 0.5 | 0.30 | 0.007502 |
| | LiCl | 2.8 | | | | |
| | HBr | 1.5 | | | | |

EXAMPLE 24

The apparatus for enrichment of uranium isotopes was constructed by connecting five jacketed developing columns having an inner diameter of 20 mm and a length of 1,000 mm as in Example 1 with three-way switch-over valves in series and filling the same anion exchange resin as in Example 1 in these columns. To the first to fifth columns were fed 10 l of an aqueous conditioning solution containing 3.1 M/l of hydrochloric acid, 1.2 M/l of ammonium chloride and 0.1 M/l of sulfuric acid by a pump to condition the packed layer of tioning solution containing 0.2 M/l of hydrochloric acid, 1.0 M/l of hydrobromic acid, 0.4 M/l of nickel sulfate and 3.0 M/l of ethylene carbonate by a pump to condition the packed layer of the anion exchange resin in the four columns. Then an aqueous oxidizing agent solution having the same composition as the aqueous conditioning solution and additionally containing 0.007 M/l of Tl(III) ion was fed to the first to fourth columns to adsorb the oxidizing agent on the anion exchange resin in the columns until the composition of the solution from the bottom of the fourth column became equal to that of the fed aqueous oxidizing agent solution. Then an aqueous uranium solution having the same composition as the aqueous conditioning solution and additionally containing 0.10 M/l of U(IV) ion and 0.01 M/l of U(VI) ion was fed to the first column to develop the uranium adsorption zone by displacement while forming an oxidation boundary from the first to the fourth column at a migration velocity of 5.8 cm/minute and a migration distance of 3.5 m. The eluant from the bottom of the fourth column was collected as separate fractions of 2.0 ml and the concentration of uranium in the region near the oxidation boundary was determined spectrophotometrically and the uranium solution in the region near the oxidation boundary was collected and purified and the U235/U238 isotopic ratio was measured using a mass spectrometer and was 0.006894.

EXAMPLE 26

Into 1.5 l of formamide was blown hydrogen chloride gas and the concentration of hydrogen chloride was measured by titration and was 2.1 M/l. To this solution was added 6 M to form a conditioning solution. Also 120 g of uranium metal were dissolved in 1,000 ml of the conditioning solution and the supernatant liquid was separated by filtration and fed to a gas-washing bottle. Then the bottle was placed in a constant temperature bath of 80° C. and oxygen gas was introduced into the bottle to oxidize U(IV) ion to U(VI) ion, resulting in a concentrated uranium solution. The concentration of U(VI) ion was measured by an automatic recording spectrophotometer and was 0.42 M/l. Subsequently, 400 ml of the concentrated uranium solution were diluted with the conditioning solution to give 5 l of a uranium solution. Further, 0.3 M of commercially available titanium trichloride was dissolved in the conditioning solution to give 1.5 l of a reducing agent solution.

The same anion exchange resin as in Example 1 was dried in a reduced pressure drier, made a slurry with the conditioning solution and packed up to a height of 820 mm in a jacketed developing column having a length of 1,000 mm and an inner diameter of 20 mm. Then 5 l of the conditioning solution were fed to the column to condition the packed layer of the anion exchange resin and subsequently 5 l of the uranium solution were fed to the column to adsorb uranium (VI) ion on the anion exchange resin. Then the reducing agent solution was fed to the column at a flow rate of 12 ml/minute to develop the uranium adsorption zone by displacement. The migration velocity of the uranium adsorption zone was 1.4 cm/minute. The eluant from the bottom of the column was collected as separate fractions of 2.0 ml and the concentration of uranium in the region near the reduction boundary was determined spectrophotometrically and also the uranium solution in the region near the reduction boundary was collected and purified and the U235/U238 isotopic ratio was measured using a mass spectrometer and was 0.007563.

While the invention has been described in detail and with reference to specific embodiments thereof, it will be apparent to one skilled in the art that various changes and modifications can be made therein without departing from the spirit and scope thereof.

We claim:

1. In a process for the enrichment of one isotope in a mixture of uranium isotopes by passing a solution of the mixture in a solvent through an anion exchanger thereby forming on the anion exchanger a boundary (A) between a uranium adsorption zone and an adjacent reducing agent zone and/or a boundary (B) between a uranium adsorption zone and an adjacent oxidizing agent zone, the uranium adsorption zone advancing through the anion exchanger, effecting reduction at the boundary (A) and/or effecting oxidation at the boundary (B), thereby effecting enrichment adjacent said boundary, and separating a fraction enriched in one of said isotopes, the improvement which comprises using as the solvent medium a compositiion comprising (a) a solvent having a dielectric constant of at least 80 at 20° C., (b) hydrochloric acid and (c) at least one of hydrobromic acid and sulfuric acid, the solvent medium having a hydrogen ion concentration of about 0.1 M/l to about 10 M/l, a total chlorine ion concentration of about 0.1 M/l to about 12 M/l, at least one of bromine and sulfate ion being present in about 0.01 M/l to about 10 M/l and the other being present in from zero up to 10 M/l, and passing the materials through the ion exchanger at a rate such that the migration velocity of the uranium adsorption zone through the ion exchanger is at least about 1 cm per minute.

2. The process of claim 1, wherein there is employed a reducing agent including at least one metal ion selected from the group consisting of Cr(II), Cu(I), V(II), V(III), Mo(III), Sn(II) and Ti(III).

3. The process of claim 1, wherein there is employed an oxidizing agent including at least one metal ion selected from the group consisting of V(V), Fe(III), Ce(IV), Tl(III), Mo(VI) and Mn(VII).

4. The process of claim 1, wherein the solvent having a dielectric constant of at least 80 at 20° C. is at least one member selected from the group consisting of water, formamide, N-methylacetamide, N-methylformamide, N-methylpropionamide, N-methylbutyramide and ethylene carbonate.

5. The process of claim 4, wherein the solvent having a dielectric constant of at least 80 at 20° C. is water.

6. The process of claim 1, wherein the solvent medium has a total chlorine ion concentration of about 1.6 M/l to about 7 M/l, a total bromine ion concentration of about 0.3 M/l to about 6 M/l and/or a total sulfate ion concentration of about 0.1 M/l to about 2.2 M/l.

* * * * *